Aug. 4, 1959    M. D. BANUS ET AL    2,898,195
METHOD FOR PREPARING SODIUM HYDRIDE
Filed May 31, 1956
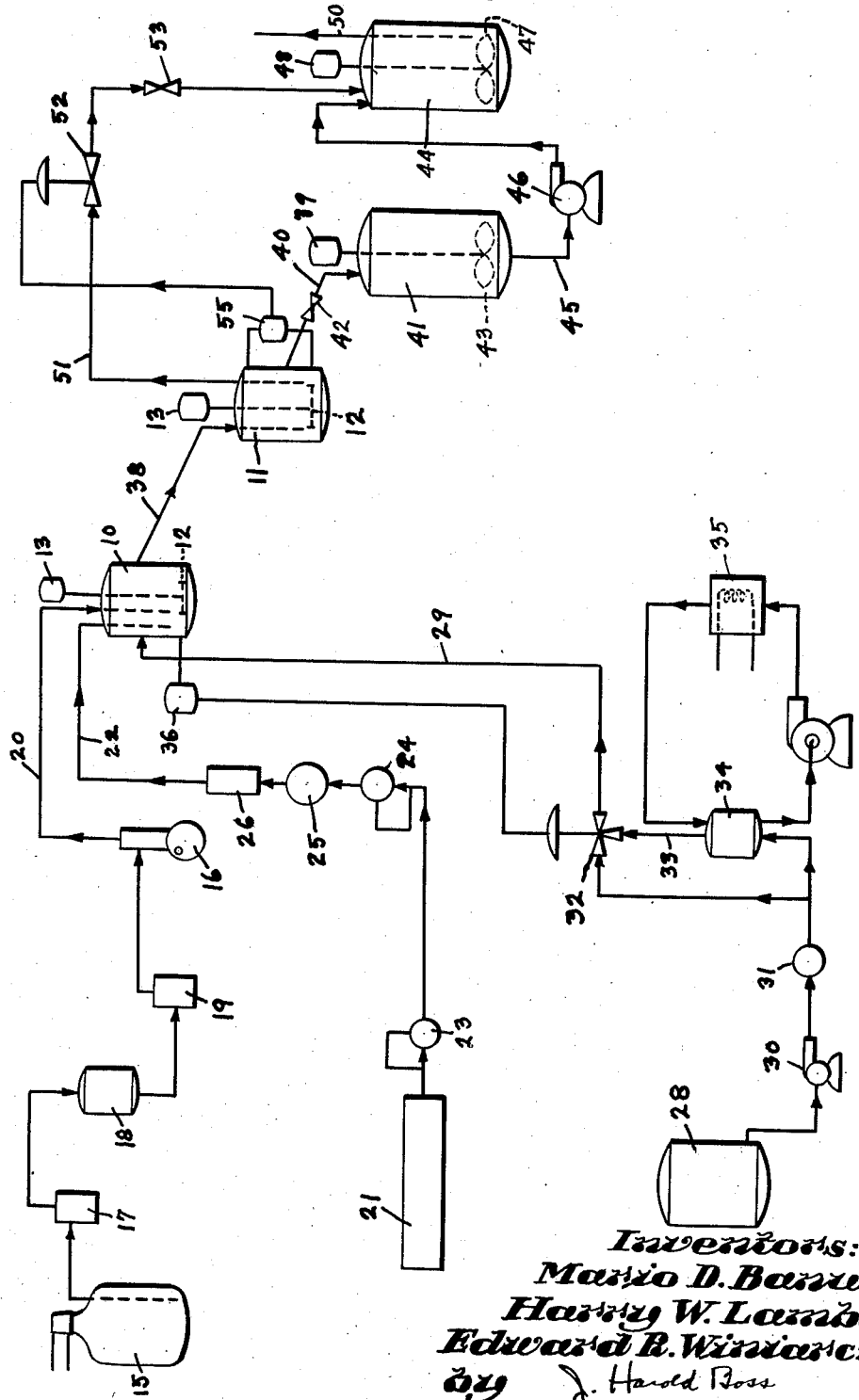
Inventors:
Mario D. Banus,
Harry W. Lambe,
Edward R. Winiarczyk,
by J. Harold Ross
Attorney

2,898,195

METHOD FOR PREPARING SODIUM HYDRIDE

Mario D. Banus, Topsfield, Edward R. Winiarczyk, Lynn, and Harry W. Lambe, West Concord, Mass., assignors, by direct and mesne assignments, to Metal Hydrides Incorporated, Beverly, Mass., a corporation of Massachusetts Application May 31, 1956, Serial No. 588,445

1 Claim. (Cl. 23—204)

This invention relates to the preparation of hydrides of the alkali metals, such as potassium, lithium and sodium hydrides.

It is well known that the preparation of sodium hydride by reacting sodium metal with hydrogen has been extremely difficult. The United States patent to Hansley No. 2,372,671 describes a method for producing sodium hydride in which a quantity of finely divided sodium hydride is placed in a closed container equipped with stirring. The container is heated at a temperature of 180° C. to 300° C. Periodically, sodium is introduced in an amount less than that required to wet completely the surface of the solid hydride and thoroughly mixed with the latter. Then, with continued agitation, hydrogen is passed into the container to convert the molten sodium to sodium hydride, a small amount of an accelerator being added to accelerate the reaction. As an accelerator, this patentee proposed the use of a hydrocarbon, such as kerosene, which is capable of reacting with sodium to form sodium hydrocarbide. For several years this method has been used for the commercial production of sodium hydride but has been unsatisfactory because the rate of reaction has been too slow and because a scale builds up in the reactor making it necessary to stop production and remove the scale.

In a copending application of Mario D. Banus and Robert C. Wade, Serial No. 374,106, filed August 13, 1953, now abandoned, a method is described for producing sodium hydride by placing sodium in a container with a high-boiling mineral oil and subjecting the mixture to high speed agitation in the presence of hydrogen and a dispersing agent while heating at a temperature between 200° C. and 400° C. This method has not been entirely satisfactory for the commercial preparation of sodium hydride because it is a batch operation and the time required for substantially completing the conversion of the sodium to sodium hydride is too long. Thus, as shown by the specific examples in that application the time required for obtaining about a 96 percent conversion of 190 grams and 100 grams of sodium was 110 minutes and 90 minutes respectively.

The present invention is based upon the discovery that a high conversion of sodium to sodium hydride at a rapid rate can be obtained by introducing molten sodium and an inert high-boiling liquid into the first of a plurality of intercommunicating confined reaction zones and causing the liquor to flow at a controlled rate through each of the reaction zones while being subjected to high speed agitation and in the presence of hydrogen under high pressure of about 25 to 200 p.s.i.

In accordance with the present preferred practice of the invention, the molten sodium and hydrogen under high pressure are introduced into the lower portion of a vertically disposed first reactor, which is the portion of most intense agitation of the liquor in the reactor. The liquor is withdrawn from the first reactor at a controlled rate from the upper portion of the body of liquor and introduced into the lower portion of a vertically disposed second reactor which is the portion of most intense agitation of the liquor therein. The liquor is withdrawn from the second reactor at a controlled rate and passed into a storage tank. The arrangement is such that an atmosphere of hydrogen under high pressure is maintained above the liquor in each reactor. The plurality of reactors may consist of more than two reactors if desired but this is not necessary. It has been found that a conversion of greater than 98 percent of the sodium to sodium hydride can be obtained at a rate of nearly 4.8 pounds of sodium per hour per gallon of working volume as compared with 0.87 pound and 0.56 pound of sodium per hour per gallon of working volume respectively in the specific examples in the above mentioned copending application above referred to.

We have discovered further that in the preferred practice of the invention as above described and wherein each of the reactors is a substantially cylindrical reactor provided with at least one rotatable agitator having a predetermined outside diameter, the reaction time using the same hydrogen pressure is substantially unaffected by the amount of reactants initially present if (1) the ratio of the internal diameter of each reactor to the outside agitator diameter is greater than 1 but less than 20, (2) the ratio of the working volume in each reactor in gallons to the cube of the outside agitator diameter in inches times the number of agitators is greater than zero but not greater than 1.5, and (3) the agitator peripheral speed in feet per minute times the number of agitators is greater than 500 and less than 20,000. The reaction time can be varied by changing the hydrogen pressure used.

A suitable apparatus for use in the practice of the invention is illustrated diagrammatically in the single figure of the accompanying drawing. This apparatus comprises a pair of vertically disposed substantially cylindrical reacting vessels 10 and 11 adapted to withstand high internal pressures. The reactor 10 is provided with a jacket (not shown) through which hot oil may be circulated to heat liquor in the reactor to a desired temperature to initiate the reaction. Each of the reactors 10 and 11 is provided with a suitable agitator 12 adapted to be rotated at high speed, such as about 2300 r.p.m., by a motor 13. A suitable agitator is a conventional bladed turbine of the "Mixco" type positioned in the lower portion of the reactor and consisting of a disc secured to the motor shaft and having a plurality of axially extending blades secured to its periphery. Each of the reactors 10 and 11 is provided with standard baffles (not shown) disposed between its shell and the periphery of the agitator and extending below the agitator and above the level of liquor in the reactor.

Means is provided for introducing molten sodium metal into the reactor 10 near the lower portion thereof at a desired controlled rate. This means comprises a sodium melting tank 15 from which molten sodium is fed by the pressure of an inert gas applied upon the sodium in the tank 15 through a coarse sodium filter 17, a weighing device 18, a fine sodium filter 19, to a pump 16 which supplies sodium at a controllable rate through a conduit 20 into the reactor 10.

Hydrogen gas may be introduced into the reactor 10 under a desired pressure near the lower portion thereof from a source 21 of hydrogen under pressure which is connected to a conduit 22 in which is interposed a first pressure regulator 23, a second pressure regulator 24, a meter 25 and a rotameter 26.

Means is provided for introducing an inert high boiling liquid, such as a liquid hydrocarbon, into the reactor 10 at a desired temperature comprising a tank 28 or other source of inert liquid which is connected with the reactor 10 by a conduit 29 in which is interposed a pump 30, a meter 31 and a mixing valve 32.

The pump 30 is driven by a variable speed motor so that the volume of liquid fed to the reactor may be controlled. A separate conduit 33, in which is interposed a tank 34 for hot inert liquid connects the meter 31 with the mixing valve 32. Means generally indicated at 35 is provided for heating the liquid hydrocarbon in the tank 34. A conventional temperature control device 36, actuated in response to the temperature of the liquor in the reactor 10, is associated with the reactor 10 and mixing valve 32 for controlling the mixing valve 32 to mix suitable proportions of cool inert liquid from the tank 28 with hot inert liquid from the tank 34 to supply the liquid at a desired temperature to the reactor 10 and thus control the temperature of the liquor in reactor 10.

In the apparatus illustrated, the reactor 10 is located in an elevated position with respect to the reactor 11. A conduit 38 communicates at its upper end with the interior of the reactor 10 at a point about midway between its top and bottom. The conduit 38 passes downwardly into the reactor 11 and its lower end communicates with the lower portion of the interior of the reactor 11. Consequently, liquor can pass by gravity through the conduit 38 from the reactor 10 into the reactor 11 and thereby maintain a predetermined liquor level in reactor 10. The conduit 38 also permits hydrogen to pass from the reactor 10 into the reactor 11. The reactor 11 may be provided with a jacket (not shown) in which cooling oil may be circulated to prevent excessive rise of temperature of the liquor in the reactor. A conduit 40 communicates at its upper end with the interior of the reactor 11 at a point about midway between its top and bottom. The conduit 40 passes downward and discharges into a high pressure storage tank 41. A manually operable valve 42 is provided in the conduit 40 for controlling communication between the reactor 11 and the storage tank 41. It will be noted that the reactor 11 is in an elevated position with respect to the storage tank 41, thereby permitting liquor to flow by gravity through the conduit 40 from the reactor 11 into the tank 41 and thereby maintain a predetermined liquor level in the reactor 11. The tank 41 is provided with an agitator 43 rotated by a motor 39 for maintaining solids dispersed in the liquor contained therein.

Liquor in the tank 41 may be transferred to a storage tank 44 through a conduit 45 by a pump 46, the storage tank being under a gas pressure of 1 to 25 p.s.i. The tank 44 is provided with an agitator 47 rotated by a motor 48. The liquor in the tank 44 may be withdrawn through the conduit 50 for use or further processing.

Means also is provided for transferring liquor from reactor 11 directly to tank 44. This means comprises a conduit 51 containing a throttling valve 52. One end of the conduit 51 communicates with the interior of the reactor 11 below the level of liquor therein, the other end of the conduit 51 communicating with the interior of the tank 44. The conduit 51 also is provided with a manually operable valve 53 for controlling communication between the reactor 11 and the tank 44. A conventional liquid level controlling device generally indicated at 55 is associated with the reactor 11 and throttling valve 52 to control the operation of the valve 52 to permit liquor to be transferred through the conduit 51 from the reactor 11 to the tank 44 while maintaining the previously mentioned predetermined level of liquor in the reactor 11.

In order to start the operation of the apparatus for the production of a dispersion of finely divided sodium hydride in an inert liquid hydrocarbon, molten sodium metal and the inert liquid hydrocarbon are fed into the reactor 10 through the conduits 20 and 29 respectively by means of the pumps 16 and 30 respectively to provide a volume of liquor in the reactor having a sodium concentration of between about 10 to 40 percent by weight, the liquor level being below the outlet through the conduit 38. The operation of the pumps 16 and 30 then is discontinued and the liquor in the reactor is heated to a temperature of about 270° C. by circulating hot oil through the jacket (not shown) surrounding reactor 10. The agitator 12 then is rotated at high speed, such as about 2300 r.p.m., to form a dispersion of finely divided molten sodium in the inert liquid hydrocarbon. The agitation is continued and hydrogen gas is introduced into the reactors through the conduit 22 to establish a hydrogen atmosphere over the liquor at a pressure of between about 25 to 200 lbs. per square inch thereby causing the hydrogen to react with the dispersed molten sodium to form finely divided solid sodium hydride dispersed in the liquid hydrocarbon. Higher pressures may be used but there is no advantage in their use. Since this reaction is exothermic, the temperature of the liquor rises to about 360° C. A decrease of temperature from this point indicates the completion of the start up phase of the operation. From this point the operation is run on a continuous basis as follows.

The operation of the pumps 16 and 30 is again started to feed additional molten sodium and liquid hydrocarbon gradually into the reactor 10 in about the original proportions. This additional sodium is converted to sodium hydride and the volume of the liquor in reactor 10 increases and flows through the conduit 38 into reactor 11. The agitator in reactor 11 then is rotated at high speed and most of the unconverted sodium metal is converted to sodium hydride in reactor 11. This operation is continued and the volume of liquor in reactor 11 increases until it flows out through conduit 40 into tank 41, it being understood that the valve 42 having been closed is now opened. The rate of operation of the pumps 16 and 30 is adjusted so that (1) molten sodium is fed into reactor 10 in order to maintain the desired production rate, (2) the amount of liquid hydrocarbon fed into reactor 10 is such as to maintain a desired sodium hydride concentration in the final product, (3) the major portion of the sodium introduced is converted to sodium hydride in reactor 10 and (4) substantially all the unconverted sodium metal entering reactor 11 is converted therein to sodium hydride. An increase in the desired production rate of sodium hydride while fulfilling the conditions above is possible by increasing the rate of sodium feed, the stirring rate in the reactors 10 and 11 and increasing the hydrogen pressure up to a limit of about 250 pounds within the limits of the equipment. When these conditions have been established and maintained the apparatus is in steady state operation. The valve 53 having been closed is now opened and the valve 42 is closed. The high pressure of hydrogen above the liquor causes it to flow from the reactor 11 through the conduit 51 into the tank 44, the liquid level controlling device 55 being adjusted to cause the throttling valve 52 to operate to maintain the previously established desired liquid levels in the reactors 10 and 11.

During steady state operation, the temperature of the liquor in reactor 10 may be controlled and excessive rise of the temperature prevented by introducing into reactor 10 a mixture of hot and cold liquid hydrocarbon in suitable proportions, this mixture being provided by the operation of the mixing valve 32 actuated by the temperature controlling device 36 in response to temperature changes of the liquor in reactor 10. A desired temperature of the liquor in reactor 11 may be maintained by circulating cool oil through the jack (not shown) surrounding reactor 11.

In the practice of the invention, the liquid medium in which the molten sodium and solid sodium hydride is dispersed may be any high-boiling inert liquid, such as a high-boiling mineral oil which is free of unsaturated components. Illustrative examples of such liquids are "Nujol"

which is a water-white mineral oil, "Primol D" which is a refined high-boiling Esso mineral oil, and "Bayol 85" which is an Esso mineral oil not as high refined as "Nujol" or "Primol D."

The invention is illustrated further by the following specific example using an apparatus of the type described hereinbefore and wherein the cylindrical portion of each of the two reactors was 26.5 inches in length and had an inside diameter of 19.5 inches, the bottom and top portions being substantially hemispherical. Each of these reactors had a nominal capacity of 50 gallons but a working volume of about 25 gallons. During the run hydrogen under a pressure of 150 lbs. per square inch was maintained in each reactor. A six bladed turbine agitator of the "Mixco" type was used in each reactor and was operated at a speed of 2000 r.p.m. Steady state operation was maintained for a period of two and one half hours with an average temperature in both reactors of 312° C. The amount of sodium and mineral oil fed to the first reactor was 3.8 and 13.3 pounds respectively per minute, giving a feed containing approximately 22.4 percent sodium. Samples taken during steady state operation showed an average of 83.7 percent conversion to sodium hydride in the first reactor and an average of 98.7 percent conversion in the second reactor, the product in the storage tank assaying 23.5 percent sodium hydride and 22.7 percent total sodium which is equivalent to a 98.9 percent conversion.

While the invention has been illustrated particularly with respect to the preparation of sodium hydride, it is equally applicable to the preparation of the hydrides of potassium or lithium by maintaining the temperature of the reactors 10 and 11 at suitable temperatures for effecting the reaction between hydrogen and potassium or lithium.

Many advantages of the invention will be readily apparent to those skilled in the art. However, it may be noted that the total residence time in the reactors is sufficiently short so that there is no darkening of the product such as occurs in batch-type reactions due to the length of time the alkali metal and inert liquid are above 300° C. during the reaction. Furthermore, in the practice of the invention a much greater production capacity is secured for the same equipment volume. By operating a plurality of reactors in a continuous operation in accordance with the invention, short circuiting of the alkali metal is greatly reduced as compared with the continuous operation in a single reactor.

An additional advantage of using a plurality of reactors is the higher rate of reaction resulting. For this reaction, the rate decreases with increasing percentage conversion. Thus by using a plurality of reactors the degree of conversion is low in the first vessels and the rate high. In the last reactor, the material is almost completely converted and the reaction rate is low. Since the amount of material to be converted per unit time is small, however, the last reactor can "keep up" with the first. This situation can be contrasted to the use of a single reactor in which the average composition is that of the finished product and the rate of reaction is low. In this single reactor, all of the feed material can be considered to undergo reaction at the low rate corresponding to the average composition.

We claim:

The method for preparing sodium hydride which comprises moving a liquor comprising molten sodium metal and an inert liquid together with solid sodium hydride at a controlled rate in a confined path upwardly in each of two vertical reactors and from near the top of the first reactor to near the bottom of the second reactor introducing hydrogen into said first reactor near the bottom thereof to maintain an atmosphere of hydrogen above the liquor in each reactor at a desired pressure, maintaining the liquor in each reactor at a temperature at which hydrogen reacts with sodium metal to form sodium hydride, subjecting the liquor in each reactor to agitation to form a dispersion of finely divided molten sodium metal and finely divided sodium hydride in the inert liquid, introducing molten sodium metal and said inert liquid into the first of said reactors in relative amounts and each at said controlled rate to provide a liquor having a sodium concentration between about 10 to 40 percent by weight, said molten sodium metal being introduced into said first reactor near the bottom thereof, and recovering at said controlled rate from near the top of the second of said reactors a liquor consisting essentially of finely divided sodium hydride dispersed in said inert liquid, each of said reactors being provided with at least one rotatable agitator having a predetermined outside diameter and in which (1) the ratio of the internal diameter of the reactor to the outside agitator diameter is greater than 1 but less than 20, (2) the ratio of the working volume in each reactor in gallons to the cube of the outside agitator diameter in inches times the number of agitators is greater than zero but not greater than 1.5, and (3) the agitator peripheral speed in feet per minute times the number of agitators is greater than 500 and less than 20,000.

References Cited in the file of this patent

UNITED STATES PATENTS 1,958,012     Muckenfuss _____ May 8, 1934

OTHER REFERENCES

Rumford: "Chemical Engineering Operations," 1951, pages 198–199.

Olsen et al.: "Chemical and Metallurgical Engineering," vol. 52, No. 5, pages 118–125 (1945).